Sept. 3, 1946.   L. WALLERSTEIN, JR   2,406,875
FLEXIBLE COUPLING
Filed Oct. 24, 1944   2 Sheets-Sheet 2
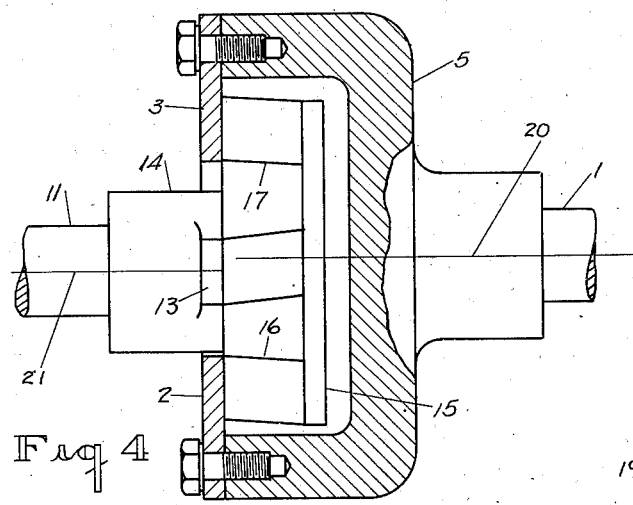
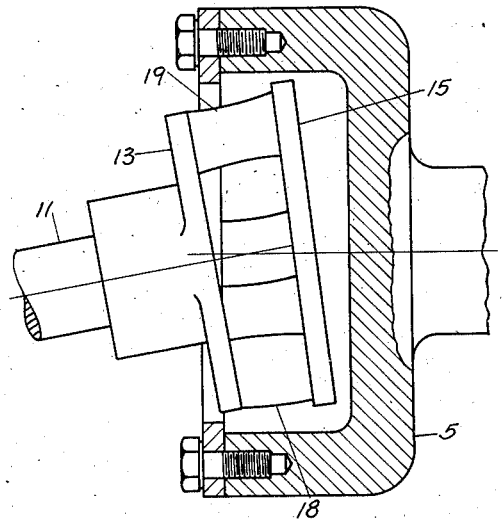
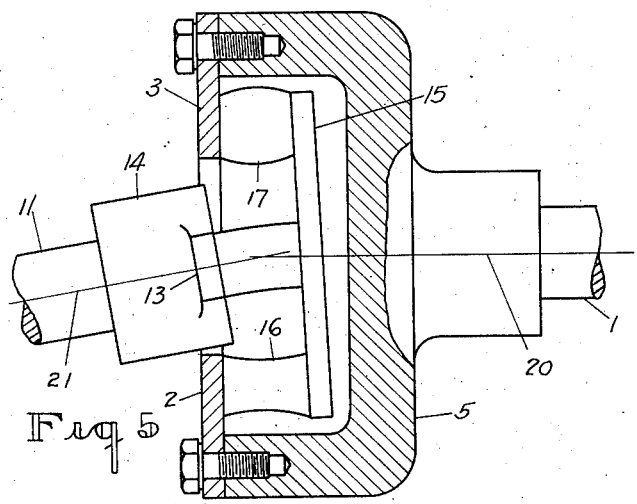
Inventor
Leon Wallerstein Jr
By Ralph Hammar
Attorney Patented Sept. 3, 1946

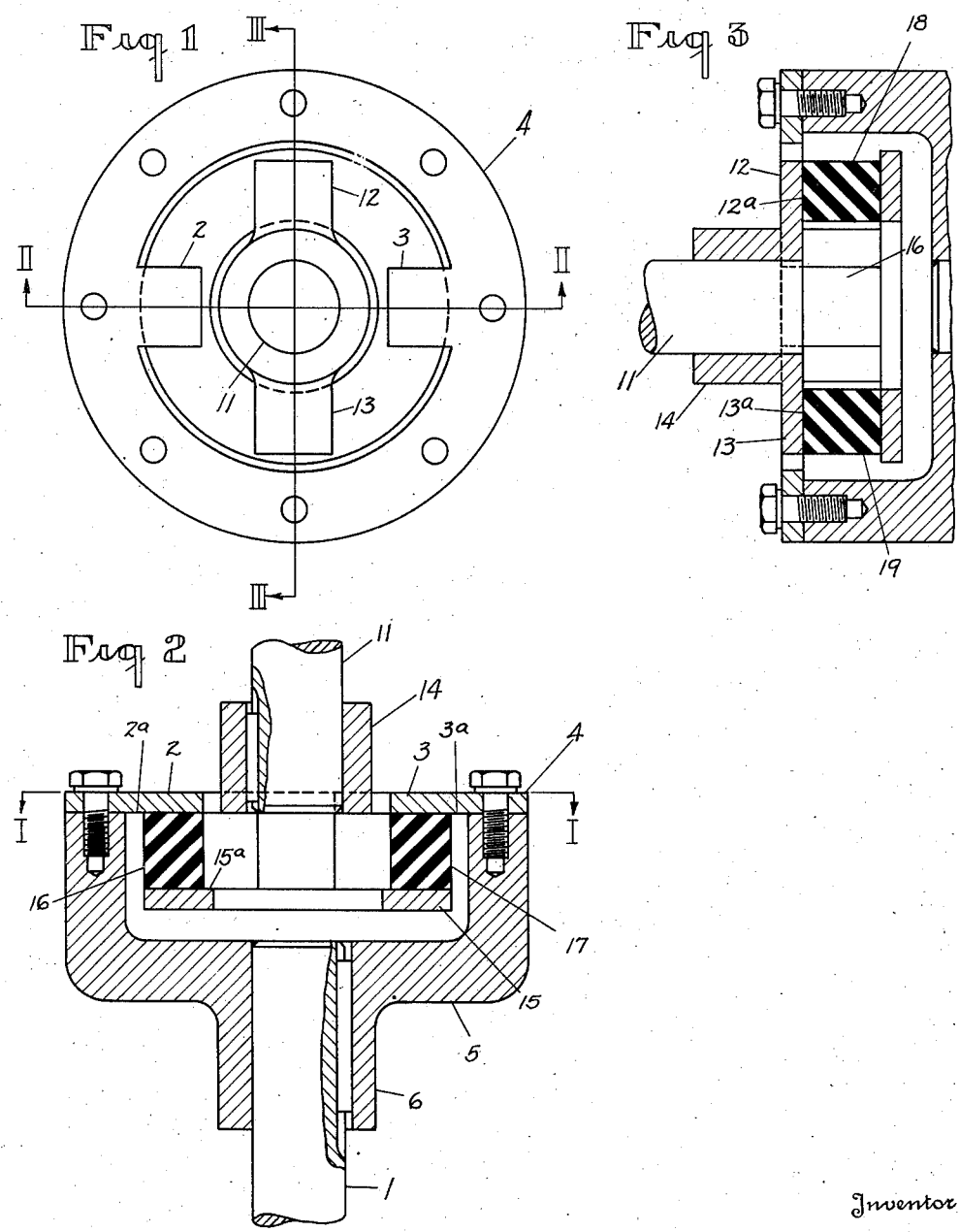

2,406,875

UNITED STATES PATENT OFFICE 2,406,875

FLEXIBLE COUPLING

Leon Wallerstein, Jr., Erie, Pa., assignor to Lord Manufacturing Company, Erie, Pa., a corporation of Pennsylvania Application October 24, 1944, Serial No. 560,140

4 Claims. (Cl. 64—11)

The invention relates to flexible couplings between the adjacent ends of a pair of driving and driven shafts, and has particularly to do with couplings of this type that include bodies of resilient material, such as rubber, adapted to transmit driving torque and to isolate or materially reduce the transmission of torque and other vibrations.

This invention provides a flexible coupling of the type explained in which torque is transmitted through shear on bodies of resilient material arranged to act in series, and in which the bodies of resilient material yield in shear to accommodate parallel and in bending to accommodate angular misalignments of the shafts. It also provides a flexible coupling of the type and character stated which includes a coupler at the adjacent ends of the shaft by which torque is transmitted in series through two pairs of diametrically disposed bodies of resilient material positioned at right angles to each other, one pair being between the driving shaft and the coupler and the other between the coupler and driven shaft.

The invention is illustrated in the accompanying drawings, of which Fig. 1 is a face view of a coupling on the plane generally indicated by the line I—I, Fig. 2; Fig. 2 a sectional view taken on the line II—II, Fig. 1; Fig. 3 a sectional view taken on the line III—III, Fig. 1; Fig. 4 a view similar to Fig. 2 showing the action of resilient torque-transmitting bodies when there is parallel misalignment of a pair of coupled shafts; Fig. 5 a view similar to Fig. 2 showing the action of the resilient torque-transmitting bodies when there is angular misalignment of the coupled shafts; and Fig. 6 a view corresponding to Fig. 5 showing the action of the resilient torque-transmitting bodies when the shafts have been rotated through an arc of 90° from the position shown in Fig. 5.

Having reference first to Figs. 1–3, a driving shaft 1 is provided with two torque-applying arms 2 and 3 which are preferably in the form of plate-like projections extending inwardly from a ring 4 to which there is attached a cup 5 that is connected to a hub 6 which is keyed to the driving shaft. Arms 2 and 3, being on opposite sides of the drive axis are disposed diametrically with relation to it, as well as angularly around it. These arms have flat faces 2a and 3a, respectively, which lie in a plane that is perpendicular to the drive axis.

A driven shaft 11 is also provided with a pair of plate-like arms 12 and 13 which are diametrically and angularly disposed with relation to and around the drive axis, and are provided with flat faces 12a and 13a, respectively, that lie in a plane perpendicular to the drive axis. These arms extend radially from a hub 14 that is keyed to the driven shaft, and are disposed at right angles to the arms 2 and 3 of the driving shaft. While one of the shafts has been designated as a driving and the other as a driven shaft, either of them may be the driving and the other the driven shaft, and either may be driven in either direction.

At the adjacent ends of the shafts there is a floating coupler which is provided with flat faces that are parallel to the faces 2a and 3a of arms 2 and 3 and to the faces 12a and 13a of arms 12 and 13. As shown, the coupler preferably takes the form of a ring 15 having a continuous flat face 15a which includes the several faces just described, although the coupler may take other forms.

Between the pairs of opposed cooperating faces of the driving and driven shafts and the coupler there are bodies of rubber which transmit torque in shear, there being two such bodies 16 and 17 between arms 2 and 3 between the driving shaft and the coupler, and two such bodies 18 and 19 between the arms 12 and 13 of the driven shaft and the coupler, the bodies of rubber 16 and 17 lying in a general plane that is at right angles to that in which the bodies 18 and 19 lie. While these bodies of rubber may be variously connected to the opposed faces of the arms and coupler, they are shown as being bonded to them.

When the axes of the driving and driven shafts are in alignment and torque is applied to driving shaft 1, it is transmitted through cup 5, arms 2 and 3, to rubber bodies 16 and 17 which transmit the torque entirely in shear stress to coupler 15. By the coupler the torque is transmitted to rubber bodies 18 and 19 which sustain it entirely in shear stress and transmit it to arms 12 and 13 which are connected to driven shaft 11 through bushing 14. Thus, torque is transmitted entirely by shear stress from the driving to the driven shaft through two pairs of rubber bodies which act in series through the intermediate floating coupler 15.

In Fig. 4 the action of the coupler is shown when there is parallel misalignment of the driving and driven shafts, such misalignment being indicated by the offset between the axis 20 of driving shaft 1 and the axis 21 of driven shaft 11. As shown, the bodies of rubber accommodate the parallel misalignment principally by shear, and the torque is also transmitted by shear on the bodies. Figs. 5 and 6 similarly illustrate the action of the bodies of rubber when there is angular misalignment of the axes 20 and 21 of the driving and driven shafts, Fig. 6 showing the coupler when the drive is turned through an angle of 90° from that shown in Fig. 5. As shown, when there is angular misalignment the rubber bodies accommodate the misalignment principally by bending, while the torque is transmitted in shear. Because in the aligned and misaligned positions of the shaft the bodies of rubber act in shear to transmit torque, a comparatively high degree of flexibility is secured which provides effective isolation for torsional vibrations, and when there is misalignment of the shafts the loads that they transmit to their bearings are kept at a minimum.

What I claim as new is:

1. A flexible coupling, comprising a driving shaft provided with angularly spaced radially-disposed arms, a driven shaft provided with angularly spaced radially-disposed arms positioned between those of the driving shaft, each of said arms being provided with a flat face lying in a plane substantially perpendicular to the drive axis, a coupler provided with flat faces substantially parallel to those of said arms and positioned opposite thereto to cooperate therewith in torque-transmitting pairs, and a body of resilient material such as rubber connected to the opposed faces of each of said pairs formed to transmit torque in shear from the driving shaft through the coupler to the driven shaft and yieldingly to accommodate misalignment of said shafts.

2. A flexible coupling, comprising a driving shaft provided with a pair of diametrically-disposed arms, a driven shaft provided with a pair of diametrically-disposed arms positioned between and at right angles to those of the driving shaft, each of said arms being provided with a flat face lying in a plane substantially perpendicular to the drive axis, a coupler provided with flat faces substantially parallel to those of said arms and positioned opposite thereto to cooperate therewith in torque-transmitting pairs, and a body of resilient material such as rubber connected to the opposed faces of each of said pairs formed to transmit torque in shear from the driving shaft through the coupler to the driven shaft in series and yieldingly to accommodate misalignment of said shafts.

3. A flexible coupling, comprising a driving shaft provided with angularly spaced radially-disposed arms, a driven shaft provided with angularly spaced radially-disposed arms positioned between those of the driving shaft, each of said arms being provided with a flat face lying in a plane substantially perpendicular to the drive axis, a floating coupler comprising a flat member having a face substantially parallel to said faces of said arms and positioned opposite thereto, and a body of resilient material such as rubber connected to said driving and driven shaft faces and to said coupler formed to transmit torque in shear from the driving shaft through the coupler to the driven shaft and yieldingly to accommodate misalignment of said shafts.

4. A flexible coupling, comprising a driving shaft provided with a pair of diametrically-disposed arms, a driven shaft provided with a pair of diametrically-disposed arms positioned between and at right angles to those of the driving shaft, each of said arms being provided with a flat face lying in a plane substantially perpendicular to the drive axis, a floating coupler comprising a flat member having a face substantially parallel to said faces of said arms and positioned opposite thereto, and a body of resilient material such as rubber connected to said driving and driven shaft faces and to said coupler formed to transmit torque in shear from the driving shaft through the coupler to the driven shaft and yieldingly to accommodate misalignment of said shafts.

LEON WALLERSTEIN, Jr.